(12) United States Patent
Cahill et al.

(10) Patent No.: US 10,093,291 B2
(45) Date of Patent: Oct. 9, 2018

(54) HYDRAULIC PARK BRAKE SYSTEM AND METHOD

(71) Applicant: GOODRICH CORPORATION, Charlotte, NC (US)

(72) Inventors: Eric Daniel Cahill, Troy, OH (US); Efrem E. Ayichew, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 62 days.

(21) Appl. No.: 15/423,174

(22) Filed: Feb. 2, 2017

(65) Prior Publication Data
US 2018/0215357 A1    Aug. 2, 2018

(51) Int. Cl.
  *B60T 8/17*   (2006.01)
  *B64C 25/44*  (2006.01)
  *B60T 15/04*  (2006.01)

(52) U.S. Cl.
  CPC .......... *B60T 8/1703* (2013.01); *B60T 15/041* (2013.01); *B64C 25/44* (2013.01); *B60T 2260/09* (2013.01); *B60T 2270/88* (2013.01); *B60Y 2400/302* (2013.01)

(58) Field of Classification Search
  CPC ............... B60T 15/041; B60T 2260/09; B60T 2270/88; B60Y 2400/302; B64C 25/44
  See application file for complete search history.

(56) References Cited

U.S. PATENT DOCUMENTS

| 6,154,636 A | 11/2000 | Wright |
|---|---|---|
| 6,193,326 B1 | 2/2001 | Ybert |
| 2005/0777830 | 4/2005 | Hidetoshi |

(Continued)

FOREIGN PATENT DOCUMENTS

| CN | 204822064 | 12/2015 |
|---|---|---|
| GB | 483457 | 4/1938 |

(Continued)

OTHER PUBLICATIONS

Definition of "vehicle", Merriam-Webster website, retrieved Jun. 11, 2018 from https://www.merriam-webster.com/dictionary/vehicle (Year: 2018).*

(Continued)

*Primary Examiner* — Calvin Cheung
(74) *Attorney, Agent, or Firm* — Snell & Wilmer L.L.P.

(57) ABSTRACT

A hydraulic park brake system for an aircraft may include a hydraulic park brake controller having a processor and a tangible, non-transitory memory configured to communicate with the processor. The tangible, non-transitory memory may have instructions stored thereon that, in response to execution by the processor, cause the hydraulic park brake system to perform various operations. Such operations may include receiving, by the processor, a hydraulic park brake condition, comparing, by the processor, the hydraulic park brake condition with a predetermined condition to yield comparison data, and determining, by the processor and based on the comparison data, a hydraulic park brake adjustment status. Such operations may further include generating, by the processor and based on the hydraulic park brake adjustment status, an adjustment command and transmitting, by the processor, the adjustment command to a hydraulic park brake of the aircraft.

16 Claims, 3 Drawing Sheets

(56) References Cited

U.S. PATENT DOCUMENTS

| | | | |
|---|---|---|---|
| 2007/0084682 A1 | 4/2007 | Griffith et al. | |
| 2008/0185235 A1* | 8/2008 | Suzuki | B60T 7/042 188/1.11 E |
| 2009/1950580 | 8/2009 | Jackson | |
| 2013/0226425 A1* | 8/2013 | Oliveira | B60T 7/122 701/70 |
| 2016/0325724 A1* | 11/2016 | Lee | B60T 13/662 |

FOREIGN PATENT DOCUMENTS

| | | |
|---|---|---|
| WO | 2008105813 | 9/2008 |
| WO | 2014021311 | 2/2014 |

OTHER PUBLICATIONS

European Patent Office, European Search Report dated Jun. 4, 2018 in Application No. 18154412.3-1012.

\* cited by examiner

HYDRAULIC PARK BRAKE SYSTEM AND METHOD

FIELD

The present disclosure relates to aircraft systems, and more specifically, to hydraulic park brake control systems.

BACKGROUND

Aircraft typically have brakes on the wheels to slow the aircraft during aborted takeoffs, landings, and/or while taxiing. Additionally, some aircraft employ hydraulic park brake systems that maintain a braking force while the aircraft is parked. However, the hydraulic pressure of such hydraulic park brake systems can change, whether caused by hydraulic fluid leakage or temperature changes, among other factors, as the aircraft sits in parked mode. This change in hydraulic pressure can result in an insufficient parking brake force or an excessive parking brake force. An insufficient parking brake force may produce an unsafe condition in which the aircraft is not properly or adequately restrained/parked in a stationary position. An excessive parking brake force may cause excessive structural load on components, among other negative consequences.

SUMMARY

In various embodiments, the present disclosure provides a hydraulic park brake system for an aircraft. The hydraulic park brake system includes a hydraulic park brake controller having a processor and a tangible, non-transitory memory configured to communicate with the processor, the tangible, non-transitory memory having instructions stored thereon that, in response to execution by the processor, cause the hydraulic park brake system to perform various operations, according to various embodiments. The various operations include receiving, by the processor, a hydraulic park brake condition, comparing, by the processor, the hydraulic park brake condition with a predetermined condition to yield comparison data, and determining, by the processor and based on the comparison data, a hydraulic park brake adjustment status, in accordance with various embodiments.

The hydraulic park brake system may further include a hydraulic park brake and a sensor coupled to the hydraulic park brake. Receiving the hydraulic park brake condition may include detecting, by the processor and via the sensor, the hydraulic park brake condition. In various embodiments, the sensor is a temperature sensor and the hydraulic park brake condition is a temperature of the hydraulic park brake. In various embodiments, the sensor is a pressure sensor and the hydraulic park brake condition is a hydraulic pressure of the hydraulic park brake. In various embodiments, the sensor is a force sensor and the hydraulic park brake condition is a magnitude of parking brake force of the hydraulic park brake.

In various embodiments, the receiving the hydraulic park brake condition is performed in response to a passage of time of the aircraft being parked. In various embodiments, the receiving the hydraulic park brake condition is performed intermittently. The determining the hydraulic park brake adjustment status may be performed in response to a passage of time of the aircraft being parked. The determining the hydraulic park brake adjustment status may be performed intermittently. The determining the hydraulic park brake adjustment status may be performed in response to the comparison data having a threshold difference between the hydraulic park brake condition and the predetermined condition.

In various embodiments, the operations further include transmitting the hydraulic park brake adjustment status to at least one of a brake control unit, a full authority digital engine control, and an engine-indicating and crew-alerting system. The operations may further include generating, by the processor and based on the hydraulic park brake adjustment status, an adjustment command and transmitting, by the processor, the adjustment command to a hydraulic park brake of the aircraft. In various embodiments, the adjustment command includes instructions to increase a parking brake force of the hydraulic park brake. In various embodiments, the adjustment command includes instructions to decrease a parking brake force of the hydraulic park brake.

Also disclosed herein, according to various embodiments, is a hydraulic park brake system for an aircraft. The hydraulic park brake system includes a hydraulic park brake, a sensor operably coupled to the hydraulic park brake, a hydraulic park brake controller having a processor, and a tangible, non-transitory memory configured to communicate with the processor, the tangible, non-transitory memory having instructions stored thereon that, in response to execution by the processor, cause the hydraulic park brake system to perform various operations, in accordance with various embodiments. The various operations may include detecting, by the processor and via the sensor, a hydraulic park brake condition, comparing, by the processor, the hydraulic park brake condition with a predetermined condition to yield comparison data, and determining, by the processor and based on the comparison data, a hydraulic park brake adjustment status.

Also disclosed herein, according to various embodiments, is a method of controlling a hydraulic park brake system of an aircraft. The method may include receiving, by a hydraulic park brake controller, a hydraulic park brake condition. The method may also include comparing, by the hydraulic park brake controller, the hydraulic park brake condition with a predetermined condition to yield comparison data and determining, by the hydraulic park brake controller and based on the comparison data, a hydraulic park brake adjustment status.

In various embodiments, the receiving the hydraulic park brake condition includes detecting, by the hydraulic park brake controller and via a sensor, the hydraulic park brake condition. The method may further include generating, by the hydraulic park brake controller and based on the hydraulic park brake adjustment status, an adjustment command. The method may further include transmitting, by the hydraulic park brake controller, the adjustment command to a hydraulic park brake of the aircraft. In various embodiments, the adjustment command includes instructions to increase a parking brake force of the hydraulic park brake. In various embodiments, the adjustment command includes instructions to decrease a parking brake force of the hydraulic park brake.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
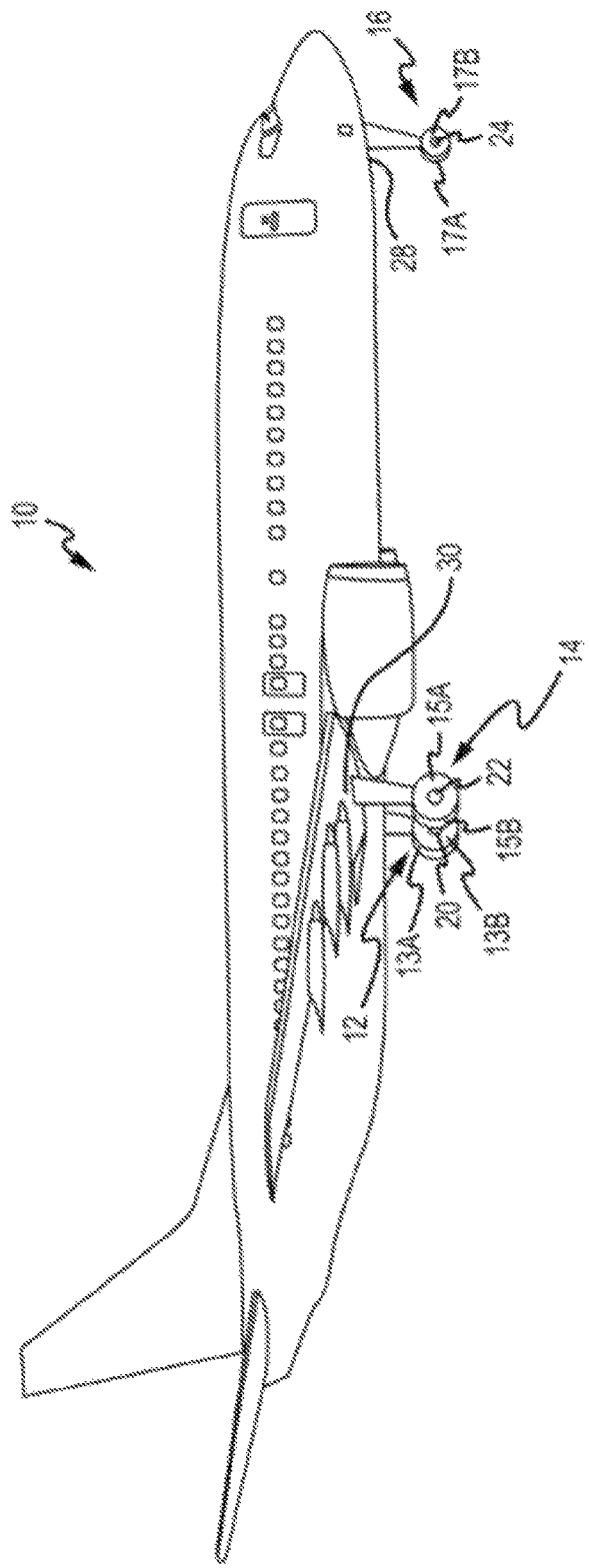
FIG. 1 illustrates an exemplary aircraft having a hydraulic park brake system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the tail (e.g., the back end) of an aircraft. As used herein, "forward" refers to the direction associated with the nose (e.g., the front end) of an aircraft, or generally, to the direction of flight or motion.

Referring now to FIG. 1, in accordance with various embodiments, an aircraft 10 may include landing gear such as main landing gear 12, main landing gear 14 and nose landing gear 16. Main landing gear 12, main landing gear 14, and nose landing gear 16 may generally support aircraft 10 when aircraft 10 is not flying, allowing aircraft 10 to taxi, take off and land without damage. Main landing gear 12 may include wheel 13A and wheel 13B coupled by an axle 20. Main landing gear 14 may include wheel 15A and wheel 15B coupled by an axle 22. Nose landing gear 16 may include nose wheel 17A and nose wheel 17B coupled by an axle 24. In various embodiments, aircraft 10 may comprise any number of landing gears and each landing gear may comprise any number of wheels. Main landing gear 12, main landing gear 14, and nose landing gear 16 may each be retracted for flight.

Aircraft 10 may also include a primary brake system, which may be applied to a wheel of a landing gear. The primary brake system of aircraft 10 may comprise a collection of subsystems that produce output signals for controlling the braking force and/or torque applied at each wheel (e.g., wheel 13A, wheel 13B, wheel 15A, wheel 15B, etc. wheel 17A, and/or wheel 17B). The primary brake system may communicate with the brakes of each landing gear (e.g., main landing gear 12, main landing gear 14, and/or nose landing gear 16), and each brake may be mounted to each wheel to apply and release braking force on one or more wheels (e.g., as described above). The brakes of an aircraft 10 may include a non-rotatable wheel support, a wheel (e.g., wheel 13A, wheel 13B, wheel 15A, wheel 15B, wheel 17A, and/or wheel 17B) mounted to the wheel support for rotation, and a brake disk stack. The brake stack may have alternating rotor and stator disks mounted with respect to the wheel support and wheel for relative axial movement. Each rotor disk may be coupled to the wheel for rotation therewith, and each stator disk may be coupled to the wheel support against rotation. A back plate may be located at the rear end of the disk stack and a brake head may be located at the front end. The brake head may house one or more actuator rams that extend to compress the brake disk stack against the back plate, or the brake disk stack may be compressed by other means. Torque is taken out by the stator disks through a static torque tube or the like. The actuator rams may be hydraulically operated actuator rams, although some brakes may use pneumatically operated actuator rams.

Figure 2:
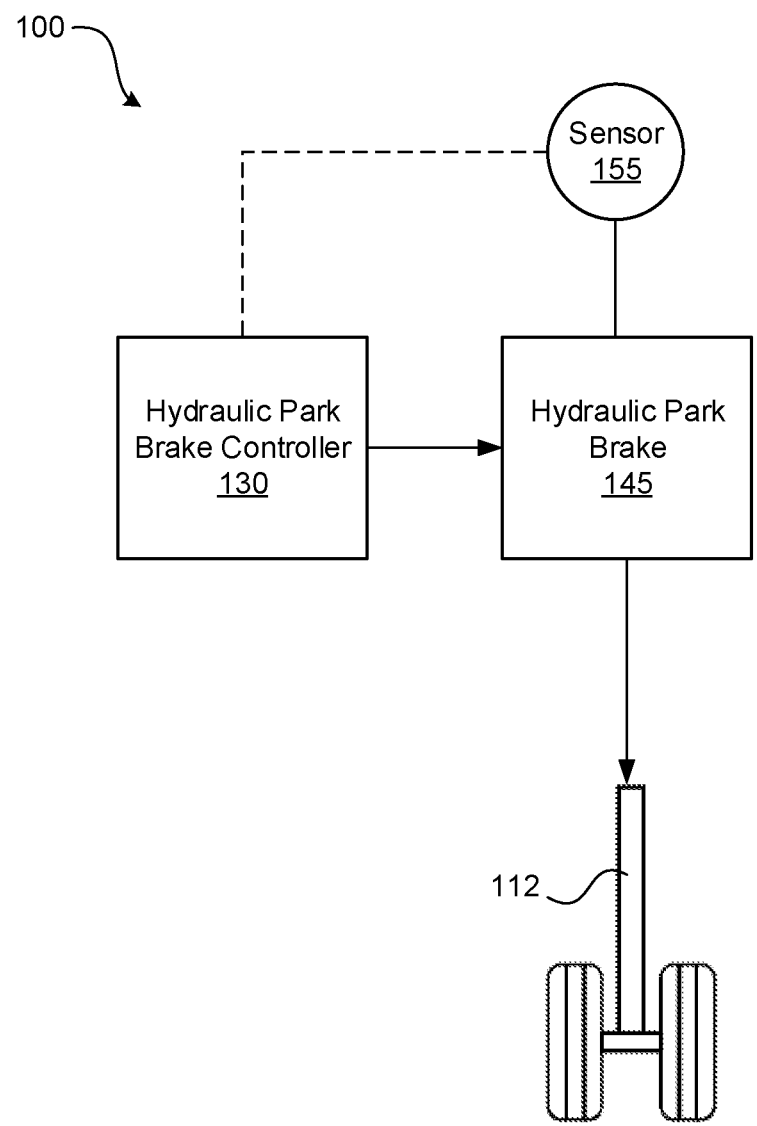
FIG. 2 illustrates a schematic of a hydraulic park brake system, in accordance with various embodiments.

Referring now to FIGS. 1 and 2, in accordance with various embodiments, aircraft 10 may comprise a hydraulic park brake system 100. The hydraulic park brake system 100 may enable park braking of aircraft 10 from multiple locations in aircraft 10. In various embodiments, the hydraulic park brake system 100 may include a separate control system from the primary brake system of aircraft 10, such as, for example, to maintain dissimilarity, independence, separation, and/or redundancy, as desired. Hydraulic park brake system 100 may also be incorporated into an emergency brake system and/or the primary brake system of aircraft 10.

In various embodiments, the hydraulic park brake system 100 includes a hydraulic park brake controller 130 configured to apply park brake control to a hydraulic park brake 145 that is coupled to a landing gear 112 (e.g., a wheel) of the aircraft 10. As discussed further herein, the hydraulic park brake controller 130 may be configured to receive a park brake signal, and translate the signals into an actuator force to control braking power. Also, as described in greater detail below, the hydraulic park brake controller 130 may be integrated into computer systems onboard aircraft 10 such as, for example, a brake control unit (BCU), a full authority digital engine control (FADEC), an engine-indicating and crew-alerting system (EICAS), and/or the like. In various embodiments, the hydraulic park brake controller 130 may be a standalone computer system separate from aircraft 10, as described in further detail herein. The hydraulic park brake system 100 may include one or more processors and/or one or more tangible, non-transitory memories capable of implementing logic. The processor and/or the memory may be components of the hydraulic park brake controller 130, or may be components of other control units that are in electronic communication with the hydraulic park brake controller 130.

The processor(s) can be a general purpose processor, a digital signal processor (DSP), an application specific integrated circuit (ASIC), a field programmable gate array (FPGA) or other programmable logic device, discrete gate or transistor logic, discrete hardware components, or any combination thereof. In various embodiments, the processor can be configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The hydraulic park brake system 100 may include one or more interfaces via which input from users/crew/pilots may be received into the hydraulic park brake controller 130. For example, the hydraulic park brake system 100 may include a cockpit brake interface and may include any suitable mechanical and/or electronic interface allowing a user, a crew member, and/or a pilot/copilot to transmit hydraulic parking brake signals to the hydraulic park brake controller 130, which in turn transmits commands to the hydraulic park brake 145 to exert a braking force on the landing gear 112 to park the aircraft 10.

As mentioned above, once the aircraft has been parked, it may be beneficial to monitor the hydraulic park brake 145 in order to ensure that a desired level of braking force is maintained. Various factors may affect the ability of the hydraulic park brake 145 to maintain the parking brake force on the wheels/landing gear 112 of the aircraft 10. For example, the magnitude of the park braking force may change in response to temperature changes of the hydraulic park brake 145 and/or hydraulic fluid leakage, among other factors. Accordingly, the hydraulic park brake system 100 disclosed herein, which includes the hydraulic park brake controller 130, a processor, and a tangible, non-transitory memory, is configured to perform various operations to monitor and check the magnitude of the park braking force, according to various embodiments. These operations, which are described in greater detail below, may include receiving, by the processor, a hydraulic park brake condition. Further, these operations may include comparing, by the processor, the hydraulic park brake condition with a predetermined condition, thereby yielding/producing comparison data. Still further, the operations performed by the hydraulic park brake system may include determining, by the processor and based on the comparison data, a hydraulic park brake adjustment status. Accordingly, the hydraulic park brake system 100 is generally configured to check the condition of the hydraulic park brake 145, compare the condition of the hydraulic park brake 145 with an expected, desired, and/or predetermined condition, and determine whether a hydraulic park brake adjustment is warranted/desired, or whether an adjustment would at least be beneficial/recommended.

For example, the hydraulic park brake 145 may be configured to, in response to a user (e.g., a pilot or a crew member) engaging the park brake, generate an optimal parking pressure, e.g., 3000 psi (20684 kPa), thus locking the wheels in place and preventing the aircraft 10 from moving while parked. Although an example of a 3000 psi (20684 kPa) parking brake pressure is mentioned, it should be understood that the systems and methods herein apply to brakes having any pressure capabilities. Whether due to one or more of the aforementioned factors, the parking brake pressure may change (e.g., due to temperature changes of the hydraulic park brake 145), thus producing a non-optimal condition of the hydraulic park brake 145. For example, if the hydraulic parking pressure increases, the hydraulic park brake system components, such as valves, piping, manifolds, etc., may be susceptible to excessive wear caused by the higher than expected/desired hydraulic parking pressure, which may damage components and/or may cause hydraulic fluid leakage (among other negative consequences). If the hydraulic parking pressure decreases, the aircraft 10 may no longer be sufficiently locked in place and the "parked" mode of the aircraft 10 may be compromised or at least diminished, thereby potentially creating safety hazards, etc.

In various embodiments and with reference to FIG. 2, the hydraulic park brake system 100 may include one or more sensors 155 operably coupled to the hydraulic park brake 145 and in electronic communication with the hydraulic park brake controller 130. In such embodiments, receiving, by the processor, the hydraulic parking brake condition may include detecting, by the processor and via the sensor 155, the hydraulic park brake condition. For example, the sensor 155 may be a temperature sensor and the hydraulic park brake condition may be a temperature of the hydraulic park brake 145. Accordingly, the predetermined condition (e.g., the desired, expected condition) of the hydraulic park brake 145 may be a temperature so that the actual hydraulic park brake temperature, detected via the temperature sensor, can be compared with the predetermined temperature to produce corresponding comparison data. The hydraulic park brake adjustment status, which may be generally defined herein as an indication of whether the hydraulic park brake 145 needs or would benefit from adjustment, can then be determined based on the comparison data. That is, for example, if the hydraulic park brake condition (e.g., the received/detected temperature of the hydraulic park brake 145) is not within an acceptable threshold range of the predetermined condition (e.g., an optimal/desired temperature), the hydraulic park brake controller 130 may determine that a hydraulic park brake adjustment is warranted and would indicate as much in the hydraulic park brake adjustment status generated by the hydraulic park brake controller 130.

In various embodiments, the sensor 155 may be a pressure sensor and the hydraulic park brake condition may be a hydraulic pressure of hydraulic fluid of the hydraulic park brake 145. Accordingly, the predetermined condition (e.g., the desired, expected condition) of the hydraulic park brake 145 may be hydraulic pressure so that the actual hydraulic park brake pressure, detected via the pressure sensor, can be compared with the predetermined pressure to produce pertinent comparison data. The hydraulic park brake adjustment status can then be determined based on the comparison data. That is, for example, if the hydraulic park brake condition (e.g., the received/detected hydraulic pressure of the hydraulic park brake 145) is not within an acceptable threshold range of the predetermined condition (e.g., an optimal/desired hydraulic pressure), the hydraulic park brake system controller 130 may determine that a hydraulic park brake adjustment is warranted and would indicate as much in the hydraulic park brake adjustment status generated by the hydraulic park brake controller 130. For example, if the hydraulic brake condition is not within 10% of the predetermined condition, the hydraulic park brake system controller 130 may determine that a hydraulic park brake adjustment is warranted.

In various embodiments, the sensor 155 may be a force sensor and the hydraulic park brake condition may be a magnitude of the park braking force of the hydraulic park brake 145. Accordingly, the predetermined condition (e.g., the desired, expected condition) of the hydraulic park brake 145 may be a braking force so that the actual magnitude of the hydraulic park brake force, detected via the force sensor, can be compared with the predetermined force to produce pertinent comparison data. The hydraulic park brake adjustment status can then be determined based on the comparison data. That is, for example, if the hydraulic park brake condition (e.g., the received/detected hydraulic parking force of the hydraulic park brake 145) is not within an acceptable threshold range of the predetermined condition (e.g., an optimal/desired hydraulic parking force), the hydraulic park brake system controller 130 may determine that a hydraulic park brake adjustment is warranted and would indicate as much in the hydraulic park brake adjustment status generated by the hydraulic park brake controller 130.

In various embodiments, the hydraulic park brake system 100 may include one or more different types of sensors and the hydraulic park brake controller 130 may be configured to compare different detected conditions with respective predetermined/desired conditions in order to determine the hydraulic park brake adjustment status. In various embodiments, receiving the hydraulic park brake condition may be performed in response to a passage of time of the aircraft 10 being parked. That is, the hydraulic park brake system 100 may be configured to check the condition of the hydraulic park brake 145 after a predetermined amount of time has passed since the aircraft was placed into "parked" status, thereby allowing, for example, the temperature of the hydraulic park brake 145 to change (e.g., cool down). In various embodiments, receiving the hydraulic park brake condition may be performed intermittently and/or repeatedly at predetermined intervals. In various embodiments, determining the hydraulic park brake adjustment status may be performed in response to a passage of time of the aircraft 10 being parked or may be performed intermittently.

As mentioned above, and according to various embodiments, the operation of determining the hydraulic park brake adjustment status may be performed in response to the comparison data having a threshold difference between the hydraulic park brake condition and the predetermined condition. That is, the default hydraulic park brake adjustment status may report, for example, that "no adjustment is needed" unless or until the comparison data indicates a threshold difference between the hydraulic park brake condition and the predetermined condition, at which point the hydraulic park brake adjustment status may be updated to report, for example, that an "adjustment is needed."

In various embodiments, the operations performed by hydraulic park brake controller 130 may further include transmitting the hydraulic park brake adjustment status to at least one of a brake control unit (BCU), a full authority digital engine control (FADEC), an engine-indicating and crew-alerting system (EICAS). In various embodiments, the operations performed by hydraulic park brake controller 130 further include generating, by the processor and based on the hydraulic park brake adjustment status, an adjustment command. Further, the operations performed by hydraulic park brake controller 130 may further include transmitting, by the processor, the adjustment command to the hydraulic park brake 145 of the aircraft 10. The adjustment command, according to various embodiments, may include a command sent to a pressure modulating valve of the hydraulic park brake 145. For example, the hydraulic park brake controller 130 may be in electronic communication with a brake pressure modulating valve of the hydraulic park brake 145 and the brake pressure modulating valve may act as a flow control element to control a fluid pressure of hydraulic park brake 145. The brake pressure modulating valve may include one or more valves (e.g., servo valves), hydraulic components, electronic components, and/or the like. The brake pressure modulating valve may alter the pressure in the hydraulic park brake 145, and thus may alter/adjust the braking force according to the adjustment command.

Figure 3:
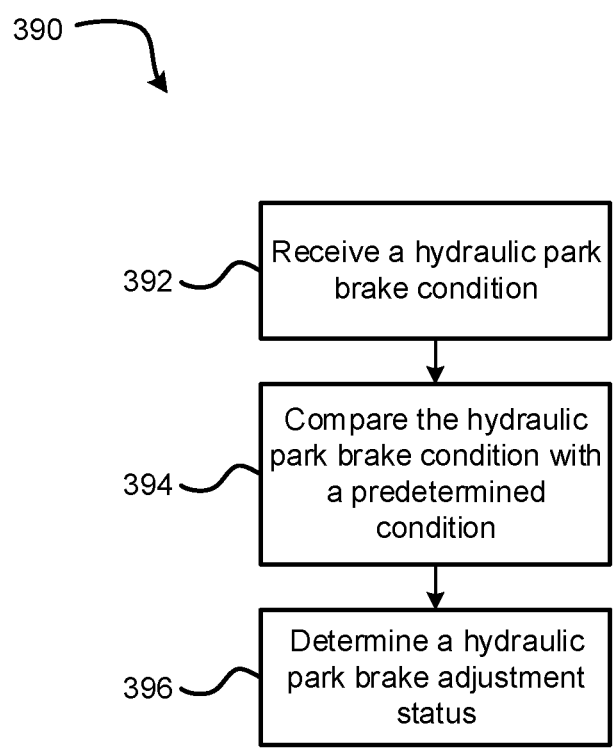
FIG. 3 is a schematic flow chart diagram of a method of controlling a hydraulic park brake system, in accordance with various embodiments.

In various embodiments, and with reference to FIG. 3, a method 390 of controlling a hydraulic park brake system is disclosed. The method 390 may include receiving a hydraulic park brake condition at step 392, comparing the hydraulic park brake condition with a predetermined condition at step 394, and determining a hydraulic park brake adjustment status at step 396. The steps 392, 394, 396 of the method 390 may be performed by a processor of the hydraulic park brake controller 130, with momentary reference to FIG. 2. Step 392 of the method 390, according to various embodiments, includes detecting, by the hydraulic park brake controller and via a sensor, the hydraulic park brake condition. The method 390 may further include generating, by the hydraulic brake controller and based on the hydraulic park brake adjustment status, an adjustment command. The method 390 may further include transmitting, by the hydraulic park brake controller, the adjustment command to a hydraulic park brake of the aircraft. As mentioned above, the adjustment command may instruct the hydraulic park brake to increase the parking brake force or the adjustment command may instruct the hydraulic park brake to decrease the parking brake force.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hydraulic park brake system for an aircraft, the hydraulic park brake system comprising:
    a hydraulic park brake;
    a sensor coupled to the hydraulic park brake;
    a hydraulic park brake controller having a processor; and
    a tangible, non-transitory memory configured to communicate with the processor, the tangible, non-transitory memory having instructions stored thereon that, in response to execution by the processor, cause the hydraulic park brake system to perform operations comprising:
        receiving, by the processor, a hydraulic park brake condition, wherein receiving the hydraulic park brake condition comprises detecting, by the processor and via the sensor, the hydraulic park brake condition;
        comparing, by the processor, the hydraulic park brake condition with a predetermined condition to yield comparison data; and
        determining, by the processor and based on the comparison data, a hydraulic park brake adjustment status.

2. The hydraulic park brake system of claim 1, wherein the sensor comprises a temperature sensor and the hydraulic park brake condition is a temperature of the hydraulic park brake.

3. The hydraulic park brake system of claim 1, wherein the sensor comprises a pressure sensor and the hydraulic park brake condition is a hydraulic pressure of the hydraulic park brake.

4. The hydraulic park brake system of claim 1, wherein the sensor comprises a force sensor and the hydraulic park brake condition is a magnitude of parking brake force of the hydraulic park brake.

5. The hydraulic park brake system of claim 1, wherein the receiving the hydraulic park brake condition is performed in response to a passage of time of the aircraft being parked.

6. The hydraulic park brake system of claim 1, wherein the receiving the hydraulic park brake condition is performed intermittently.

7. The hydraulic park brake system of claim 1, wherein the determining the hydraulic park brake adjustment status is performed in response to a passage of time of the aircraft being parked.

8. The hydraulic park brake system of claim 1, wherein the determining the hydraulic park brake adjustment status is performed intermittently.

9. The hydraulic park brake system of claim 1, wherein the determining the hydraulic park brake adjustment status is performed in response to the comparison data comprising a threshold difference between the hydraulic park brake condition and the predetermined condition.

10. The hydraulic park brake system of claim 1, wherein the operations further comprise transmitting the hydraulic park brake adjustment status to at least one of a brake control unit, a full authority digital engine control, and an engine-indicating and crew-alerting system.

11. The hydraulic park brake system of claim 1, wherein the operations further comprise:
    generating, by the processor and based on the hydraulic park brake adjustment status, an adjustment command; and
    transmitting, by the processor, the adjustment command to a hydraulic park brake of the aircraft.

12. The hydraulic park brake system of claim 11, wherein the adjustment command comprises instructions to increase a parking brake force of the hydraulic park brake.

13. The hydraulic park brake system of claim 11, wherein the adjustment command comprises instructions to decrease a parking brake force of the hydraulic park brake.

14. A hydraulic park brake system for an aircraft, the hydraulic park brake system comprising:
    a hydraulic park brake;
    a sensor coupled to the hydraulic park brake;
    a hydraulic park brake controller having a processor; and
    a tangible, non-transitory memory configured to communicate with the processor, the tangible, non-transitory memory having instructions stored thereon that, in response to execution by the processor, cause the hydraulic park brake system to perform operations comprising:
        detecting, by the processor and via the sensor, a hydraulic park brake condition;
        comparing, by the processor, the hydraulic park brake condition with a predetermined condition to yield comparison data; and
        determining, by the processor and based on the comparison data, a hydraulic park brake adjustment status.

15. A method of controlling a hydraulic park brake system of an aircraft, the method comprising:
    receiving, by a hydraulic park brake controller, a hydraulic park brake condition;
    comparing, by the hydraulic park brake controller, the hydraulic park brake condition with a predetermined condition to yield comparison data;
    determining, by the hydraulic park brake controller and based on the comparison data, a hydraulic park brake adjustment status;

generating, by the hydraulic park brake controller and based on the hydraulic park brake adjustment status, an adjustment command; and transmitting, by the hydraulic park brake controller, the adjustment command to a hydraulic park brake of the aircraft;

wherein the adjustment command comprises instructions to at least one of increase a parking brake force of the hydraulic park brake and decrease the parking brake force of the hydraulic park brake.

16. The method of claim 15, wherein the receiving the hydraulic park brake condition comprises detecting, by the hydraulic park brake controller and via a sensor, the hydraulic park brake condition.

\* \* \* \* \*